Figure 1:
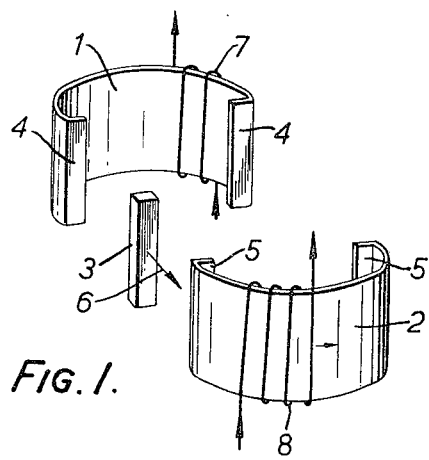

United States Patent Office 3,346,841
Patented Oct. 10, 1967

3,346,841
MAGNETOSTRICTIVE ACOUSTIC TRANSDUCERS
Helmut Weichart, Hannover, Germany, assignor to Prakla Gesellschaft fur Praktische Lagerstattenforschung G.m.b.H., Hannover, Germany, a corporation of Germany
Continuation of application Ser. No. 437,690, Mar. 8, 1965. This application Feb. 28, 1967, Ser. No. 619,485
Claims priority, application Germany, Mar. 19, 1964, P 33,871
6 Claims. (Cl. 340—17)

This application is a continuation of application Ser. No. 437,690, filed on Mar. 8, 1965, now abandoned.

The present invention relates to a cylindrical magnetostrictive acoustic transducer for use in liquids, particularly for seismic measurements at sea.

For seismic acoustic measurements at sea it is known to arrange a plurality of acoustic transducers, together with their associated conductors in an oil filled hose. Such measuring cables are made at the length of more than a kilometer. Conveniently, also a tensile element is arranged in the form of one or more steel ropes within the hose. The most favourable arrangement of the tensile element is that of a single steel rope on the center line of the measuring cable.

Since the magnetostrictive transducers hitherto known were made in the form of hollow cylinders with toroidal coils mounted on them, said acoustic transducers had to be slipped individually over the measuring cable.

The magnetostrictive material has its internal stress conditions varied by varying pressures, whereby a variation of the magnetic flux in the annular metal body takes place owing to the magnetostrictive properties of its material. In order to prevent any disturbance of the path of the magnetic lines of force and of the state of mechanical stress, one has endeavoured hitherto to lay out the magnetostrictive acoustic transducers in such a manner that at least in each individual magnetostrictive sheet metal piece a closed circuit for the magnetic lines of force exists.

The present invention has the primary object of providing a magnetostrictive acoustic transducer, which can be fitted subsequently at any place desired on an existing measuring cable. With this and other objects in view which will become apparent later from this specification and the accompanying drawing, I provide a magnetostrictive acoustic transducer for seismic measurements comprising in combination: cylindrical segments of magnetostrictive material forming between them a closed magnetostrictive circuit.

Preferably, the faces of said segments juxtaposed to one another at the divisions between the separate segments offer larger areas to the magnetic flux than the cross sectional area of the magnetostrictive segments themselves, and more particularly said segments are formed of magnetostrictive sheet metal and said larger areas are formed by turning up the margins of said cylindrical segments of magnetostrictive sheet metal.

Moreover preferably at least one permanent magnet inserted at a division between adjacent magentostrictive segments is magnetized in the direction of the magnetic lines of forces in the latter.

By inserting into said segments a non-magnetizable supporting body likewise consisting in two halves with non-symmetrically arranged longitudinal ledges on them the transducer may have a mechanically firm structure and a firmly coherent magnetic circuit, in spite of consisting of separate components.

Figure 3:
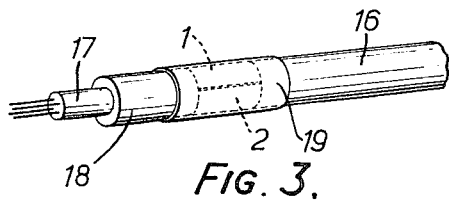
Figure 2:
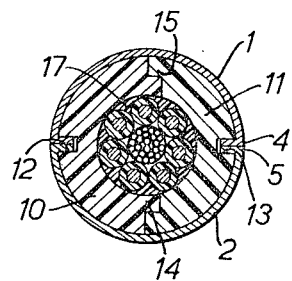

These and other features of my said invention will be clearly understood from the following description of a preferred embodiment thereof given by way of example with reference to the accompanying drawing in which:

FIG. 1 is a diagrammatic perspective view of a magnetostrictive acoustic transducer according to the present invention, before assembly, FIG. 2 is a section of a magnetostritive acoustic transducer according to FIG. 1 after assembly with the aid of a supporting body, and FIG. 3 is a perspective view on a smaller scale of a measuring cable provided with an acoustic transducer according to FIG. 2.

A semi-cylindrical shell 1 of magnetostrictive sheet metal forms in FIG. 1 one half of the magnetostrictive acoustic transducer. This sheet metal shell 1 has turned-up margins 4, which form dividing faces of the acoustic transducer. The other half 2 of the transducer is constructed symmetrically to said half shell 1 and provided with turned-up margins 5 forming dividing faces. Each of the halves 1 and 2 is surrounded by a toroidal coil 7 and 8, respectively, so that variations of the magnetic lines of forces running in the circumferential direction of the cylinder formed on assembly induce corresponding voltages in the coils. Permanent magnets 3, magnetized in the direction of the arrow 6, may be inserted at one or both dividing faces 4, 5. Since the dividing faces are large as compared with the cross-sectional area of the sheet metal, a material of high coercitive force and low permeability may be used, such as sintered oxide magnets, particularly for the permanent magnets 3.

The cross section of a mechanically assembled acoustic transducer shows in FIG. 2 the halves 1 and 2 joined with their turned-up margins 4, 5 in slots 12 and 13 of a supporting body 10, 11, respectively. These slots 12, 13 are arranged in the middle of the circumference of a half 10, 11, respectively, of this supporting body and have a width corresponding to twice the thickness of the magnetostrictive sheet metal of the transducer. These halves 10, 11 are not symmetrical to one another, the half 10 having ledges 14 arranged at the inner parts of the dividing faces, while the half 11 has ledges 15 arranged at the outer parts of these dividing faces. When assembling these halves of the supporting body, which consist of magnetically non-conductive material, a cylindrical body is thus formed, whose halves cannot be displaced relative to one another in the dividing plane. By the margins, 4, 5 turned 90° relative to the position of the dividing face of these halves 10, 11 and inserted into the slots 12 and 13 thereof, on assembly a firmly self-supporting cylindrical acoustic transducer is formed, which if desired, may be further reinforced by impregnation with sutiable adhesives, such as self-hardening resins.

The portion of a measuring cable 16 illustrated in FIG. 3 shows an acoustic transducer 1, 2 subsequently fitted to the cable. At the place of fitting the acousitc transducer 1, 2 merely the sheath 18 of the measuring cable had been previously removed so that the transducer 1, 2 after being fitted and connected to one of the pairs of conductors 17, has its outer circumference flush with the circumference of the cable. Over the place of fitting subsequently part of a hose 19 may be pushed and shrunk on to the sheath 18 by heating.

It is also possible to spray a second sheath subsequently on to a measuring cable fitted with acoustic transducers since the outer surface of the acoustic transducers whose parts were fitted from both sides of the cable is flush with the sheath 18 adjacent on both sides thereof.

While I have herein described and illustrated in the accompanying drawings what may be considered typical and particularly useful embodiments of my said invention, I wish it to be understood that I do not limit myself to the particular details and dimensions illustrated and described; for obvious modifications will occur to a person skilled in the art.

What is claimed is:
1. A magnetostrictive acoustic transducer comprising in combination:
- a support having a central axis,
- a longitudinal extension parallel to said axis and of a limited diameter perpendicular to said axis,
- at least one piece of magnetostrictive material of substantially arched configuration mounted on said support,
  - said piece extending over a limited arc around said axis,
  - said arched piece having an opening the diameter of which is larger than said limited diameter of said support,
  - said piece having opposed end portions,
- at least one piece of ferromagnetic material having opposed ends which closely engage said opposed end portions of said magnetostrictive piece, thereby forming a closed magnetostrictive circuit, and a plurality of conductor windings coiled around said piece of magnetostrictive material,
  - the faces of said segments juxtaposed to one another at the divisions between the separate segments offering larger areas to the magnetic flux than the cross-sectional area of the magnetostrictive segments themselves,
- said segments being formed of magnetostrictive sheet metal and said larger areas being formed by turning up the margins of said cylindrical segments of magnetostrictive sheet metal,
- a central cylindrical supporting body of nonmagnetizable material having longitudinal slots on its circumference,
  - said turned-up margins of adjacent magnetostructive sheet metal segments being inserted in said slots in contact wtih one another.

2. A magnetostrictive acoustic transducer as claimed in claim 1, wherein
- said central cylindrical supporting body has two halves divided on a diametrical plane from one another,
  - one of said halves having longitudinal ledges at the inner portion of its dividing plane, and
  - the other one of said halves having longitudinal ledges at the outer portion of its dividing face.

3. A cable for seismic exploration at seat comprising the combination of
- a continuous load-bearing core extending substantially the entire length of the cable;
- a plurality of electrical conductors extending axially along said core;
- a first sheath enclosing said core and said conductors;
- a second sheath enclosing said first sheath,
  - said second sheath having a plurality of inwardly extending recesses axially spaced along its length;
- a plurality transducer means removably secured in said recesses for converting pressure variations into electrical signals, each of said transducer means comprising
- first and second mating transducer portions dimensioned to be joined to form a single closed tubular structure having an outer surface of the same shape and size as the outer surface of said second sheath,
  said first and second portions each having a maximum axial dimension not greater than the axial length of at least one of said recesses in said second sheath;
- first and second mating spacer members which, when joined in mating relationship, form a tubular structure having an axial length not greater than the axial length of at least one of said recesses and a wall thickness sufficiently great to occupy the volume of said recess not occupied by said transducer means; and
- means for electrically interconnecting said transducer means and said electrical conductors.

4. A cable according to claim 3 and further comprising
- a third sheath extending substantially the entire length of the cable and forming a continuous watertight enclosure for said cable and said transducer means.

5. A cable according to claim 3 wherein said transducer means further comprises
- means for interlocking said first and second transducer portions and said first and second spacer members in mating relationship in said recesses.

6. A cable for seismic exploration at sea comprising the combination of
- a continuous load-bearing core extending substantially the entire length of the cable;
- a plurality of electrical conductors extending axially along said core;
- a first sheath of nonmagnetic and electrically non-conductive material extending axially along and enclosing said core and said conductors, said sheath having
  - a plurality of first axially defined zones within which the outer surface of said first sheath defines a first circular cylinder, and
  - a plurality of second zones within which the outer surface of said first sheath defines a second circular cylinder having smaller dimensions than said first cylinder;
- a plurality of transducer means for converting pressure variations into electrical signals, each of said transducer means comprising
  - first and second arcuate members adapted to be placed in abutting relationship around said core and said conductors in one of said second zones to form a tubular transducer assembly having an outer surface of the same size and shape as said first circular cylinder,
  - circuit means for interconnecting said first and second arcuate members and said electrical conductors, and
  - spacer means for maintaining the outer surface of said tubular transducer assembly flush with the outer surface of said first zones; and
- a second cylindrical sheath for enclosing said first sheath and said transducer means.

No references cited.

BENJAMIN A. BORCHELT, *Primary Examiner.*

P. A. SHANLEY, *Assistant Examiner.*